Figure 3:
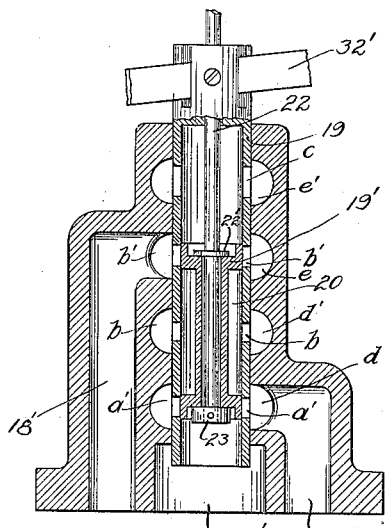

W. A. DOBLE.
HYDRAULIC NOZZLE.
APPLICATION FILED APR. 10, 1913.

1,157,853.

Patented Oct. 26, 1915.
2 SHEETS—SHEET 1.

WITNESSES:
H. A. Stock
Harry H Totten

INVENTOR
Wm. A. Doble
BY N. A. Acker
ATTORNEY

W. A. DOBLE.
HYDRAULIC NOZZLE.
APPLICATION FILED APR. 10, 1913.

1,157,853.

Patented Oct. 26, 1915.
2 SHEETS—SHEET 2.

WITNESSES:
H. A. Stock
Harry H. Totten

INVENTOR
Wm A. Doble
BY N. A. Acker
ATTORNEY

UNITED STATES PATENT OFFICE.

WILLIAM A. DOBLE, OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

HYDRAULIC NOZZLE.

1,157,853.

Specification of Letters Patent.

Patented Oct. 26, 1915.

Application filed April 10, 1913. Serial No. 760,106.

*To all whom it may concern:*

Be it known that I, WILLIAM A. DOBLE, a citizen of the United States, residing at the city and county of San Francisco and State of California, have invented certain new and useful Improvements in Hydraulic Nozzles, of which the following is a specification.

The hereinafter described invention relates to a hydraulic nozzle designed mainly for directing a stream of water onto the vanes of a rotary motor, such, for instance, as a water wheel, and the object of the invention is to provide as an integral structure the feature of a valve controlled nozzle and the controlling means for actuating the valve of the nozzle to proportion the stream issuing therefrom in accordance with the load variations placed onto and off the water wheel.

Ordinarily, the governing means for a hydraulic nozzle or hydraulic installation is situated at some distance from the hydraulic valve controlled nozzle, and it is required that complicated connecting means be extended from the governor to the valve mechanism of the nozzle, the said nozzle and governor means being installed as independent working instrumentalities. The result of the introduction of extended transmitting connecting devices between the governing mechanism and the actuating means for the valve of the valved controlled nozzle is loss motion between the parts, and frictional loss, resulting in slow movement as to transmission for the operation of the valve controlling the stream issuing from the nozzle and non-synchronous action between the governing means and the controlling valve of the nozzle; besides, independent governing mechanism and its connection with an independent valve controlled nozzle, means an increased expense over the introduction of a combined valve controlled nozzle and governing means as an integral structure, and, additionally, requires the care of an operator relative to the independent working structures.

By providing as an integral structure a valve controlled hydraulic nozzle with contained governing means for actuating the valve of the nozzle, the expense incident to the working connections between two separated working instrumentalities at present in use is eliminated, the loss motion between the said interworking parts and the loss due to frictional wear is overcome, and synchronous action between the governing feature and the valve element of the nozzle results, while the governor controlled valved nozzle is installed as a single working instrumentality.

To comprehend the invention, reference should be had to the accompanying sheets of drawings, wherein—

Figure 1:
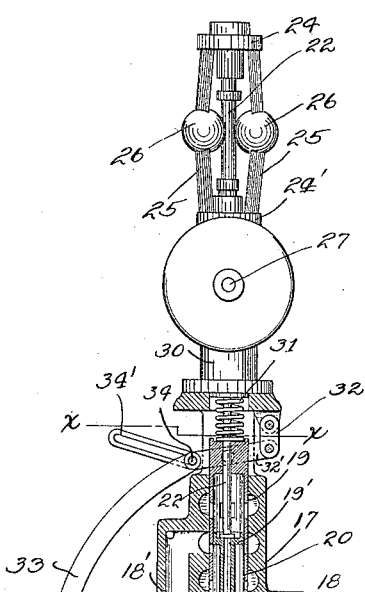
Figure 1:
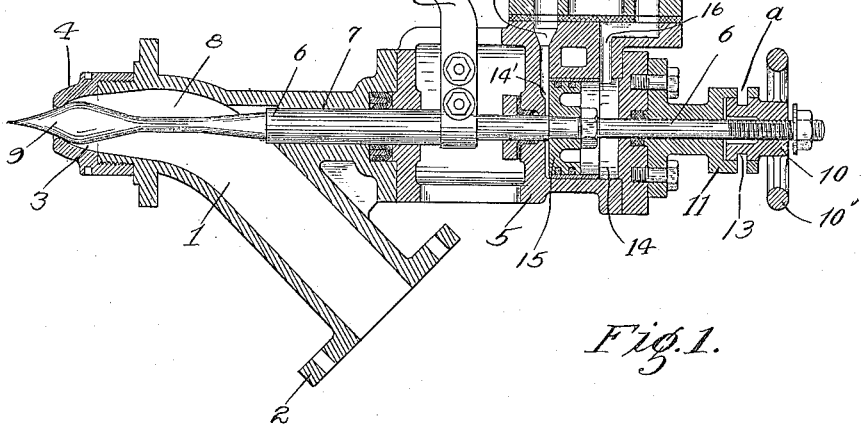
Figure 4:
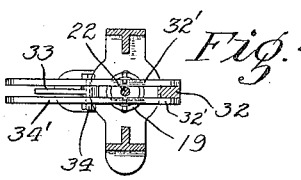
Figure 2:
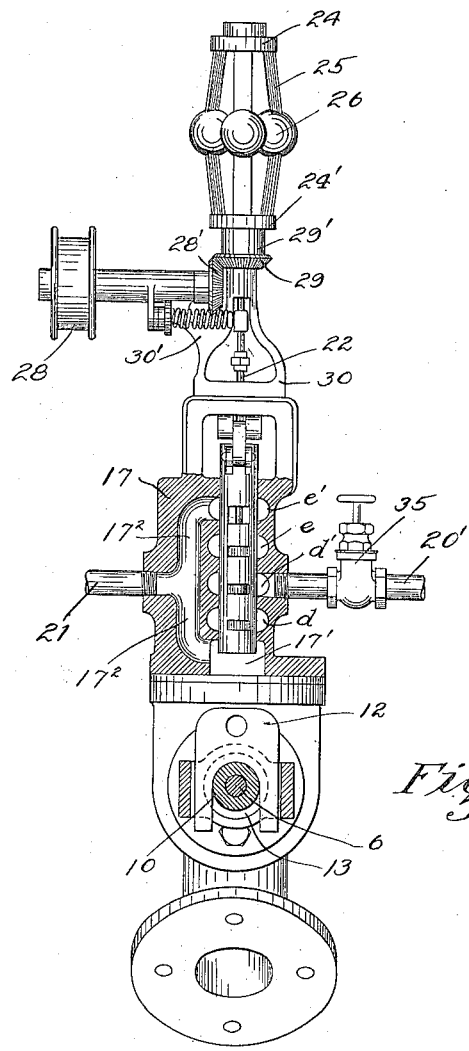

Figure 1 is a vertical sectional view of the improved hydraulic nozzle, the valve thereof being illustrated in closed position. Fig. 2 is an end elevation viewed from the rear of the nozzle, the upper portion of the nozzle forming the pressure chamber thereof being in section. Fig. 3 is an enlarged detail vertical sectional view of the pressure chamber, illustrating the relative position of the pilot valve and the slide cut-off sleeve situated therein when the parts are in normal position. Fig. 4 is an irregular sectional plan view taken on line $x$—$x$—Fig. 1 of the drawings, illustrating the link connection for actuating the slide cut-off sleeve within the pressure chamber of the nozzle on a movement of the controlling valve.

In the drawings, the numeral 1 designates a hydraulic nozzle, preferably of curved form, which is adapted to be secured to a water supply pipe line, not shown, in any suitable manner, as, for instance, by coupling bolts extended through the outwardly extended circumferential flange 2. The nozzle is provided with the usual outlet orifice 3 for the issuance of an impact stream, the said outlet orifice in the present case being formed in a nozzle tip 4 removably secured to the discharge end of the nozzle. The said nozzle is provided with a rearwardly extended body portion 5, which acts as a guide bearing for the stem 6 slidably mounted therein, the said stem being extended through a bore 7 of the nozzle into the water chamber 8 thereof, and the said stem carrying at its forward end the valve 9 tapered to fit within the outlet orifice 3 of the nozzle.

For the purpose of the present application, the said valve 9 is illustrated as what is commonly known as a "needle" valve, although the shape and form of the said valve is not to be understood as being limited in any manner whatever, inasmuch as any suitably constructed valve capable of closing and opening the outlet orifice of the nozzle in accordance with the working conditions of the hydraulic installation may be employed.

The free end of the valve stem 6 extends beyond the body portion 5 of the nozzle and is screw-threaded to receive an adjusting nut 10, which is actuated by a hand wheel 10' for shifting the stem 6 for securing an initial adjustment for the valve 9 relative to the outlet orifice of the nozzle 1, on the said nut 10 being held to the guide block 11 secured to the body 5 against longitudinal movement by means of the lock pin 12, which pin extends through a slot $a$ in the guide block 11, straddling the nut 10 and fitting within the grooved portion 13 thereof. While the nut 10 is thus held locked to the guide block or bearing against longitudinal movement, it is nevertheless free to rotate relative thereto and with the rotary movement thereof serves to feed the stem 6 outwardly and inwardly, depending on the direction of its rotation. The lock pin 12 is only employed when it is desired to secure a hand adjustment of the valve 9 relative to the outlet orifice 3 of the nozzle, at all other times the said pin is removed and the stem 6 with the adjusting nut 10 thereon left free for longitudinal reciprocating movement.

The body portion 5 of the nozzle 1 is formed with a fluid chamber 14, and within said chamber works a piston 15 to which is secured in any suitable manner the valve stem 6. With the chamber 14 communicates the separated ports 16 and 16' for the admission of a fluid supply under pressure into and out of the said chamber. From the nozzle's body 5 upwardly pojects an extension 17, which is provided or formed with vertical passageways 18 and 18' which register respectively with the ports 16 and 16'. Within the extension 17 of the nozzle is located and works a slide cut-off sleeve or cylinder 19, which is closed at its upper end, and within said cut-off sleeve is situated a vertically movable pilot valve 19', a pressure chamber 20 existing between the interior wall of the said cut-off sleeve and the pilot valve 19'. The cut-off sleeve 19 is provided with a series of open ports $a'$, $b$, $b'$, $c$, which register respectively with the annular chambers $d$, $d'$, $e$, $e'$, within the extension 17, the ports $a'$ and $b'$ of the slide cut-off sleeve being controlled respectively by the lower and upper heads of the pilot valve 19'.

Water or suitable fluid under pressure is admitted into the annular chamber $d'$ from a valve controlled pressure supply pipe 20', the water or fluid under pressure entering the chamber $d'$ flowing into the pressure chamber 20 through the port $b$ of the slide sleeve 19. The waste fluid, as hereinafter explained, flows through the port $b'$ into the sleeve 19 above the pilot valve 19', passing therefrom through the port $c$ into the chamber $e'$, from which it escapes through the outlet pipe 21. Through the pilot valve 19' is extended a rod 22, the collar 22' thereof resting on the upper end of the said valve. The said rod is held to the pilot valve by means of a securing nut 23 secured to the lower end thereof, so that the pilot valve is raised and lowered through the medium of the rod 22.

The rod 22 is suitably connected at its upper end to a governor head 24, which in turn is connected to the rotatably mounted block 24' by means of the spring arms 25 which carry fly-balls 26 of a governor. Rotation is imparted to the said fly-balls from a shaft 27, driven by a belt, not shown, working over the belt pulley 28 secured to the driven shaft 27. At its inner end the shaft 27 carries a pinion 28', which is in mesh with a pinion 29 secured to the hub 29' of the block 24'. It will be understood that the head 24 and the block 24' are loosely mounted on the rod 22 for free rotation. The rod 22 works through a support 30 secured to the upper end of the extension 17, which support carries the bracket extension 30' for the driven shaft 27. Within the support 30 is located a spring 31, which surrounds the rod 22 and acts against the sleeve 19 for holding the same in proper position relative to the extension 17. To the support 30 is pivoted a short depending link 32, the free end of which is pivoted to a lever 32'. This lever is extended through a slot in the upper end of the cut-off sleeve 19 and fulcrumed thereto, and to the free end thereof is pivoted a downwardly extended link 33, connected at its lower end to an arm 33' secured to and upwardly projected from the valve stem 6. The connection thus made between the said parts serves to actuate the same relative to the movement of the valve 9 controlling the outlet orifice 3 of the nozzle, as hereinafter explained.

The connecting stud, bolt or pin 34 between the upper end of the link 33 and the outer end of the lever 32' works within a slotted extension 34' extended from the lever 32', so as to properly guide the parts as swung inwardly and outwardly with the movement of the shiftable parts of the apparatus. The bolt 34 is adapted to loosely engage in the slotted way 34', and these parts coöperate to insure free vertical movement of the cut off sleeve and prevent any binding tendency or canting action of the sleeve in the housing provided by the extension 17, in the movement of the cut off sleeve under the action of the levers 33, 32', and link 32.

It will be understood that the shaft 27 is driven from the motor or water wheel actuated by the jet stream issuing from the outlet orifice of the nozzle, which is directed against the vanes or buckets thereof.

The operation of the improved nozzle is as follows: The valve 9 having first been set or adjusted to regulate the outlet orifice 3 for the stream to issue therefrom, and the lock pin 12 removed to allow for free slide movement of the stem 6. The water or issuing stream discharging from the nozzle places into action the motor or wheel against which it is directed, which in turn actuates the shaft 27 for driving the fly-balls 24' of the governing means. On opening the valve 35 of the pressure supply pipe 20', which preferably extends from the pressure water line pipe, fluid under pressure is admitted into the pressure chamber 20 of the cut-off sleeve 19. In case the working load on the driven motor should for any reason decrease, calling for a reduction as to the water quantity of the issuing impact stream, the fly-ball 26 will at once over-race, that is, be driven at a higher rate of speed than under normal working conditions. As the fly-balls 26 are thrown outwardly by centrifugal force due to the high rotative speed thereof, the spring arms 26 moving therewith expand laterally and are drawn together vertically, drawing downwardly the head 24 and the rod 22. This movement of the rod 22 forces downwardly the pilot valve 19' to gradually uncover the port $a'$ of the slide cut-off sleeve 19, causing the water or pressure fluid to flow from within pressure chamber 20 into the chamber 14 of the nozzle through the communicating passage-way 18 and the port 16. The fluid under pressure thus admitted into the chamber 14 back of the piston 15 therein, forces outwardly the said piston and the valve stem 6 to which it is attached and gradually moves the valve 9 into the outlet orifice 3 of the nozzle, gradually reducing the area of the outlet orifice until the stream issuing therefrom has been properly adjusted as to water quantity to the working requirements of the motor driven thereby. The moment this shifting movement of the valve 9 commences, the arm 33' carried by the stem 6 throws the link 33 and the lever 32' so as to permit the spring 31 to gradually force downwardly the cut-off sleeve 19 until the port $a'$ is closed to cut off the fluid supply pressure into the chamber 14 and bringing the valve 9 to a state of rest and restoring the fly-balls to normal position. The action of the cut-off sleeve 19 is almost in unison with the movement of the pilot valve 19', excepting for the slight initial movement permitted the said valve to admit fluid pressure back of the piston 15. On a call for a greater water quantity of the impact stream onto the driven motor, due to an increase load placed thereon, the speed of the fly-balls 26 lowers below normal speed, which causes an upward expansion or straightening out of the spring arms 25. This movement of the arms raises or lifts the rod 22, carrying therewith the pilot valve 19' to uncover the port $b'$ of the sleeve 19. The fluid pressure then flows from the chamber 20 into the passage-way 18' through the open port $b'$, and into the chamber 14' in advance of the piston 15 through the port 16'. The pressure thus applied in advance of the piston 15 gradually forces the same inwardly, carrying therewith the stem 6 and withdrawing the valve 9 from within the outlet orifice 3 so as to allow for a stream of increased area to issue from the nozzle to proportion the same to the working requirements of the motor driven thereby. As the piston commences its inward movement, the arm 33' moving with the stem 6 operates the link 33 and lever 32' to force upwardly the cut-off sleeve 19 to gradually close the port $b'$ and cutting off the fluid supply pressure in advance of the piston 15, thus bringing the said piston and the valve 9 to a state of rest with the outlet area of the orifice 3 properly proportioned for the required impact stream to issue therefrom for the working load of the driven motor. The fluid back of the piston 15 on the inward movement thereof is displaced into the chamber 17' of the extension 17 beneath the slide cut-off sleeve 19 and is gradually forced into the discharge outlet 21 through the passage-way $17^2$, with which the chamber $e'$ communicates. On the outward movement of the piston 15, the fluid in advance thereof is admitted into the chamber $e'$ through the passage-way 18' of the extension 17 and the ports $b'$ and $c$ of the slide cut-off sleeve 19.

It will thus be noticed from the above that the cut-off sleeve 19 moves in unison with the pilot valve 19' after its initial movement to admit pressure for actuating the valve 15 in either direction, and the said sleeve serves to gradually cut-off the fluid pressure relative to the piston 15 as the water quantity of the impact stream is proportioned to the working requirement of the load placed onto the motor driven thereby. The movement of the slide cut-off sleeve in either direction is slightly increased over the movement of the pilot valve, in order to close the port controlling the fluid pressure to the piston 15,—this movement being equal to the initial movement permitted the pilot-valve.

By the described invention there is provided a simple, compact, efficient and inexpensive unitary hydraulic element, one wherein there is embodied means for varying the area outlet orifice for an issuing impact stream in accordance with the call for an increase or a decrease in the water quantity thereof, together with inter-connected working instrumentalities for automatically shifting the position of the means for varying the area of the outlet orifice in accordance with such calls for an increase or decrease in the water quantity of the issuing impact stream and positively bringing said means to a state of rest on the proper adjusting being made and holding the same against movement until a call is made requiring a change in such adjustment.

In case of a rupture in the governing means for actuating the controlling means for the outlet orifice of the nozzle, the said controlling means may be manually actuated through the medium of the hand wheel 10' on the lock pin 12 being inserted to lock the adjusting nut 10 against longitudinal movement, as heretfore described.

The part 1 which in the body of the specification has been designated as the nozzle, in reality constitutes the waterway element of the nozzle. However, by the term nozzle as herein employed is meant the assembled parts 1, 5 and 17, whether the same be formed as a single casting or as separate parts suitably united. In the present case, said features are disclosed as separate elements united one to the other, but such is merely illustrative of the preferred structural arrangement.

While I have shown and described one embodiment of inter-connected instrumentalities for successfully carrying out the invention, such is merely the preferred form for accomplishing the desired ends in view, but I do not wish to be understood as confining myself to such an embodiment of the invention, inasmuch as I am well aware that changes may be made in the details of construction and arrangement of the described working parts without creating a departure from the nature, scope and spirit of the invention.

Having thus described the invention what is claimed as new and desired to be protected by Letters Patent is:—

1. In a hydraulic nozzle, a body part having a connected nozzle part and a piston chamber, a valve for the nozzle outlet, a piston on the valve rod for actuating the same, a pilot valve cylinder positioned on the body part, having a fluid pressure inlet, and outlets communicating with the piston chamber at opposite sides of said piston, a pilot valve for regulating said outlets, a governor for actuating the pilot valve, a fluid pressure cut off positioned within the valve cylinder, a spring for normally holding the cut off in one position, and means connected to the valve stem acting in opposition to the spring for actuating the cut off in one direction.

2. In a hydraulic nozzle, a body part, a nozzle and a piston chamber, a valve for said nozzle, a piston on the valve rod for actuating the same, a pilot valve cylinder positioned on the body part of the nozzle, having a fluid pressure inlet, and outlets communicating with the piston chamber at opposite sides of said piston, a pilot valve for regulating said outlets, a governor for actuating the pilot valve, a fluid pressure cut off sleeve interposed betwen the pilot valve and its cylinder, a bracket on the piston rod, a link connected to said bracket, an auxiliary lever connected with the link and pivotally supported at its opposite end, said auxiliary lever having a movable connection with said sleeve, and a spring interposed between one end of the sleeve and a fixed part on the device.

3. In a device of the class described, the combination of a nozzle having a horizontal extension forming a piston chamber, a needle valve for regulating the orifice of the nozzle, a piston on the rod positioned within the piston chamber, an upright pilot valve casing positioned on said extension of the nozzle, said casing having in the wall thereof channels communicating with the interior of the casing and with the interior of the piston chamber one at each side of the piston, a piston valve in the pilot valve chamber, having a valve rod projecting upwardly above the valve casing, a governor positioned on the valve casing and connected with said piston valve rod, a fluid pressure inlet port for the pilot valve cylinder, a sleeve cut off interposed between the pilot valve and the pilot valve casing, a spring sleeved upon the pilot valve rod interposed between the end of said cut off sleeve and governor support, and a movable connection between said sleeve and the nozzle valve rod, substantially as and for the purpose described.

4. In a hydraulic nozzle construction, the combination of a horizontally disposed body part, a nozzle secured thereto, a needle valve for the outlet of the nozzle, said valve having a horizontally disposed stem projecting through the body part, and said body part having a fluid pressure chamber, and an upright extension having vertically disposed passageways registering with ports in the wall of said body part whereby to establish communication with opposite ends of the fluid pressure chamber, a piston secured to said valve stem at a point within said fluid pressure chamber, a pilot valve in the upward extension of the body part, a cut off sleeve interposed betwen the pilot valve and the inner annular wall of the upright extension, said cut off sleeve having openings, and said annular wall of the upward extension having openings, a governor, and said sleeve having a part projecting above said upright extension, and a lever connection between said projecting part of the sleeve and the needle valve stem, substantially as and for the purpose described.

In testimony whereof I have signed my name to this specification in the presence of two subscribing witnesses.

WILLIAM A. DOBLE.

Witnesses:
HARRY A. TOTTEN,
D. B. RICHARDS.